(12) United States Patent
Hundt et al.

(10) Patent No.: US 9,864,941 B2
(45) Date of Patent: Jan. 9, 2018

(54) MAGNETIC CORE, METHOD FOR PRODUCING A MAGNETIC CORE AND METHOD FOR PRODUCING AN ELECTRIC OR ELECTRONIC ASSEMBLY WITH A MAGNETIC CORE

(71) Applicant: VACUUMSCHMELZE GMBH & CO. KG, Hanau (DE)

(72) Inventors: Harald Hundt, Dieburg (DE); Markus Wehring, Seligenstadt (DE); Nina Friedenberger, Bruchkoebel (DE); Achim Kipper, Bruchkoebel (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 5 days.

(21) Appl. No.: 14/996,512

(22) Filed: Jan. 15, 2016

(65) Prior Publication Data

US 2016/0210546 A1 Jul. 21, 2016

(30) Foreign Application Priority Data

Jan. 16, 2015 (DE) ........................ 10 2015 200 666

(51) Int. Cl.
*G06K 19/06* (2006.01)
*H01F 41/02* (2006.01)

(52) U.S. Cl.
CPC . *G06K 19/06187* (2013.01); *G06K 19/06028* (2013.01); *H01F 41/0226* (2013.01)

(58) Field of Classification Search
CPC ........ G06K 19/06187; G06K 19/06028; H01F 1/12
USPC .................................. 235/375, 487, 493, 494
See application file for complete search history.

(56) References Cited

U.S. PATENT DOCUMENTS

| 3,548,492 | A |   | 12/1970 | Weber |             |
|-----------|---|---|---------|-------|-------------|
| 3,636,438 | A | * | 1/1972  | Etchison, Jr. ...... | G01R 33/1223 |
|           |   |   |         |       | 198/339.1   |
| 4,224,500 | A |   | 9/1980  | Cruickshank |       |
| 4,940,966 | A |   | 7/1990  | Pettigrew |         |
| 5,162,700 | A | * | 11/1992 | Soileau ................ | H05B 41/391 |
|           |   |   |         |       | 315/151     |
| 5,474,624 | A | * | 12/1995 | Suzuki .................... | C22C 45/00 |
|           |   |   |         |       | 148/120     |
| 5,612,524 | A |   | 3/1997  | Sant'Anselmo |      |

(Continued)

FOREIGN PATENT DOCUMENTS

DE S28423MAZ 9/1884
DE 967047 9/1957

(Continued)

OTHER PUBLICATIONS

Office Action on German Application No. DE102015200666.2 dated Sep. 24, 2015.

(Continued)

*Primary Examiner* — Paultep Savusdiphol
(74) *Attorney, Agent, or Firm* — Dickinson Wright PLLC (57) ABSTRACT

Magnetic core made of soft magnetic material with a data medium attached to, mounted on or integrated in the magnetic core, with data in machine-readable form being stored on the data medium, the data representing at least one magnetic parameter of the magnetic core or its corresponding electrical parameter, measured at at least two different temperatures.

19 Claims, 6 Drawing Sheets

(56) References Cited

U.S. PATENT DOCUMENTS

| | | | |
|---|---|---|---|
| 5,751,207 A | 5/1998 | Poess | |
| 6,475,303 B1 | 11/2002 | Hasegawa | |
| 6,484,881 B1 * | 11/2002 | Alvite | B65D 73/02 206/714 |
| 6,967,551 B2 | 11/2005 | Natsumeda | |
| 8,154,369 B2 * | 4/2012 | Dahlgren | H01F 3/10 335/217 |
| 2002/0015388 A1 | 2/2002 | Kim | |
| 2004/0233057 A1 | 11/2004 | Sillis | |
| 2005/0007296 A1 | 1/2005 | Endo | |
| 2007/0273467 A1 * | 11/2007 | Petzold | H01F 1/15308 336/234 |
| 2011/0267167 A1 * | 11/2011 | Ogawa | H01F 41/098 336/221 |
| 2012/0119871 A1 * | 5/2012 | Ogawa | H01F 41/098 336/221 |

FOREIGN PATENT DOCUMENTS

| | | |
|---|---|---|
| DE | 2512889 | 10/1975 |
| DE | 3104270 A1 | 9/1982 |
| DE | 3526047 | 1/1987 |
| DE | 4107020 | 9/1992 |
| DE | 19548530 | 6/1997 |
| DE | 10034427 | 1/2002 |
| DE | 10341962 A1 | 4/2004 |
| DE | 102005062016 A1 | 7/2007 |
| DE | 202014000077 U1 | 2/2014 |
| EP | 1609159 | 12/2005 |
| GB | 2359962 A | 9/2001 |

OTHER PUBLICATIONS

Epcos Datenbuch Ferrites and Accessoires Data Book 2001, p. 318, p. 322.

Wurth Elektronik WE-LF . . . Nr. 74461240004 of Aug. 15, 2013.

Datenblatt Yageo, . . . Issue nr. 201304 (cf. EM Link).

* cited by examiner

FIG 11 ered on the magnetic core. Stored on the data
MAGNETIC CORE, METHOD FOR PRODUCING A MAGNETIC CORE AND METHOD FOR PRODUCING AN ELECTRIC OR ELECTRONIC ASSEMBLY WITH A MAGNETIC CORE This application claims benefit of German Patent Application No. DE 10 2015 200 666.2, filed 16 Jan. 2015, the entire contents of which is incorporated herein by reference.

TECHNICAL FIELD

The present disclosure relates to a magnetic core, a method for producing a magnetic core and a method for producing an electric or electronic assembly with a magnetic core.

BACKGROUND

Commonly used inductive components feature a magnetic core made of a soft magnetic material with one or more wire windings wound around it. The magnetic core can be ring-shaped or have any other form and can be made of ferrite or of an amorphous or nanocrystalline material. Magnetic cores can also be formed of wound tape and, in this case, they are known as tape wound cores.

Inductive components include, for example, current-compensated (common mode) chokes. In order to manufacture current-compensated chokes that have a high level of impedance and yet a small number of windings, tape wound cores of amorphous nanocrystalline tape are preferred. Such tape wound cores make it possible to combine high permeability (for example μ>100.000) with good high frequency behavior while achieving a volume-optimized choke design with low ohmic losses.

There are, however, no efficient adjustment methods for magnetic cores made of wound tape. Adjustment is necessary because the actual inductivity value of the inductive components generally differs greatly from the target value, depending on the manufacturer. Adjustment methods used for other kinds of magnetic cores or other magnetic materials cannot easily be applied to tape wound cores. For example, a fine-tuning of the inductivity tolerance by grinding the core or by adjusting a screw core, which is common practice with certain kinds of ferrite cores, is not possible with tape wound cores at present.

When amorphous or nanocrystalline alloys are employed, the permeability of the magnetic core, and thus the basis for the inductivity L of the choke, are adjusted using, for example, thermal field treatment. When a production batch undergoes uniform thermal treatment, the best degree of variation achievable in magnetic core permeability in relation to the target permeability is ±10%. An additional tolerance of up to ±15% over the target permeability of the magnetic core can result from variations in the permeability of the raw materials, in particular in the composition of the alloy, or can be caused by various technological influences such as the thickness of the tape, the winding tension, geometric irregularities of the tape, magnetostriction, the effects of the glue used to attach the magnetic core in its housing, etc. It is therefore desirable to provide inductive components having a very small inductivity tolerance.

SUMMARY

A first example is related to a magnetic core made of soft magnetic material with a data medium attached to, mounted on or integrated in the magnetic core. Stored on the data medium is machine-readable data representing values measured at at least two different temperatures and which stands for at least one magnetic parameter of the magnetic core or its corresponding electrical parameter.

A second example relates to a method for producing an electric or electronic assembly having a magnetic core made of soft magnetic material with a data medium attached to, mounted on or integrated in the magnetic core. Stored on the data medium is machine-readable data representing values measured at at least two different temperatures and which stands for at least one magnetic parameter of the magnetic core or its corresponding electrical parameter. The method further comprises automatically reading the machine-readable data from the data medium, calculating at least one compensation value on the basis of the read machine-readable data and adjusting the electric or electronic assembly in accordance with the at least one calculated compensation value. In a particular embodiment, during the calculation of the at least one compensation value, a discrete or continuous progression over temperature of the at least one magnetic parameter of the magnetic core or its corresponding electrical value is determined from the stored collected data. In a more particular embodiment, during the determination of the discrete or continuous progression over temperature of the at least one magnetic parameter of the magnetic core or its corresponding electrical parameter, further data is interpolated.

A third example relates to a method for producing a magnetic core of a soft magnetic material with a data medium attached to, mounted on or integrated in the magnetic core. Stored on the data medium is machine-readable data representing values that stand for at least one magnetic parameter of the magnetic core or its corresponding electrical parameter, measured at at least one first temperature and at a differing second temperature.

The method includes measuring at the first temperature a first value of at least one magnetic or electrical parameter of the magnetic core and producing corresponding data from the measured first value, measuring at the second temperature a second value of at least one magnetic or electrical parameter of the magnetic core and producing corresponding second data from the measured second value and storing the first and second data on the data medium. In a particular embodiment, the method includes producing third data representing the first temperature; producing fourth data representing the second temperature; and storing the third and fourth data on the data medium. In a more particular embodiment, the data to be stored can desirably be stored in semiconductor memory arranged on or in the magnetic core, or can be applied to the magnetic core in the form of an optical bar code or a matrix code. This can desirably be integrated in, or applied on a sticker, foil, or pad that is mounted on the magnetic core.

Additional aspects and advantages will become apparent from the following drawings, detailed description and claims.

DETAILED DESCRIPTION

Figure 1:
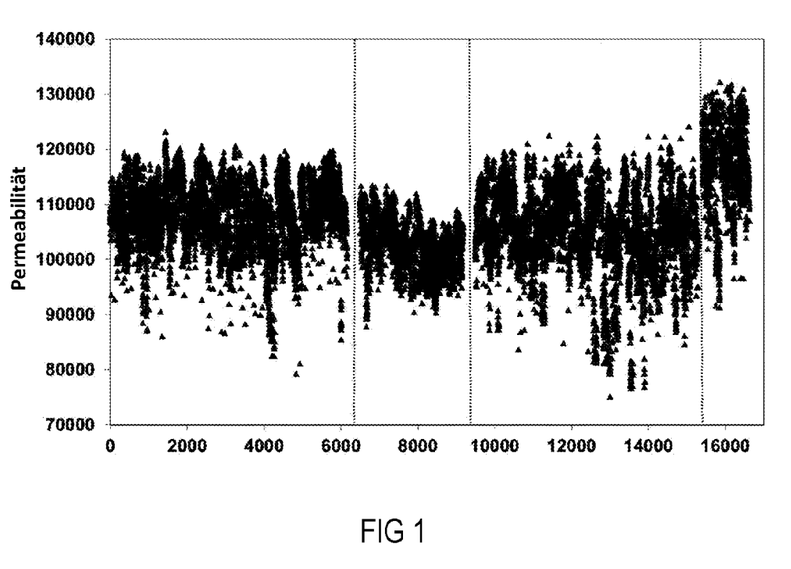
FIG. 1 is a diagram depicting the variation in the initial permeability of four different batches of magnetic cores.

FIG. 1 is a diagram in which the variation in the initial permeability (Y axis) of four different batches of magnetic cores is listed above the serial numbers of each batch of magnetic cores (X axis). The data used here is based on a standard production volume of magnetic cores with thermally treated magnetic fields containing, for example, 10,000 cores per batch.

The final product, in this case, for example, a current-compensated choke with a magnetic core made of an amorphous or nanocrystalline alloy which has undergone thermal field treatment, generally has a specified inductivity tolerance of, for example, +50% to −30%. A current-compensated choke based on a toroidal ferrite core, which has a permeability μ ranging from 5,000 to 10,000, generally has a specified inductivity tolerance of up to, for example, ±30%. One common way of reducing the tolerance of wound components, i.e. by adapting the number of windings to adjust the inductivity, is not usually an available option with, for example, current-compensated chokes, as these are usually constructed with only 3 to 30 windings, often with even fewer than 15 windings. If, for example, one alters the number of windings from 15 to 14 or 16, this will already change the inductivity by 14%, which is generally too much to serve as an increment/decrement for adjusting the fluctuating permeability of the magnetic core. Non-wound magnetic cores cannot be adjusted by adapting the number of windings anyway, as they do not have any.

Core materials that can be used to produce magnetic cores with a low inductivity tolerance, such as, for example, metal powder are, because of their low maximally achievable permeability and the high number of windings and/or significantly increased volume that this necessitates, unsuitable for many applications, including, for example, current-compensated chokes.

The inductivity tolerance on which the observations above are based relates to room temperature—a temperature assumed to be constant. In practice, however, deviations dependent on temperature will occur. If it is desired that the inductivity of a choke exhibit only a minimal tolerance within a wider temperature range, one of, for example, −40° to +120° C., then the temperature behavior of the magnetic material is decisive.

Figure 2:
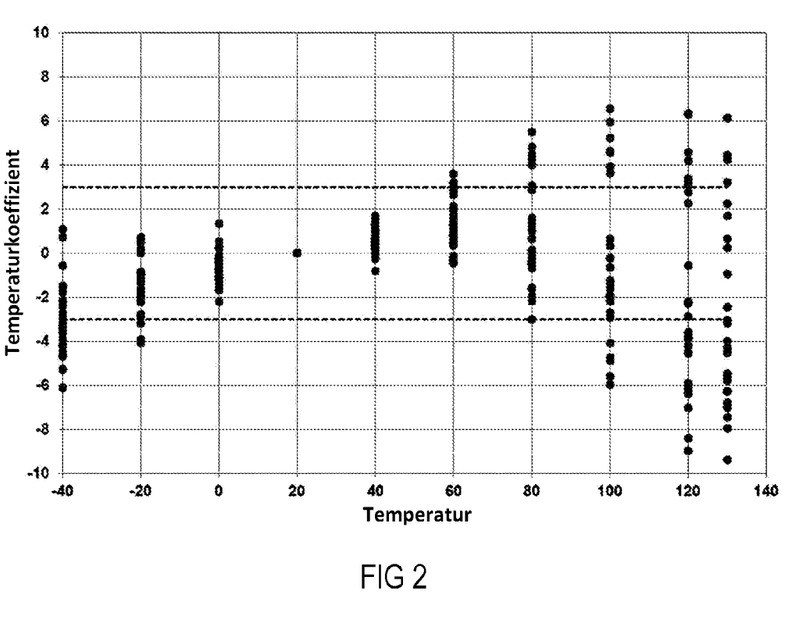
FIG. 2 is a diagram the variation in the temperature coefficients of the permeability in magnetic cores from various batches.

The material's response to temperature, however, depends on the production batch and therefore varies significantly. FIG. 2 depicts the variation of the temperature coefficients in magnetic cores from different batches in terms of the relation of their permeability μ' at various temperatures within the range of −40° to +120° C. to their permeability μ' at 20° C.

The temperature dependency of the inductivity of wound magnetic cores made of nanocrystalline alloys becomes apparent, for example, when current-compensated chokes are employed in transformers. Here the magnetic cores can exhibit a temperature coefficient of their permeability of 0.2 to 0.5%/K. This, in a temperature range of −40° to +120° C., results in an inductivity tolerance of ±32%, at best.

It is, on the one hand, desirable to produce, in an automated production process, magnetic cores with very low inductivity tolerance and inductive components containing such magnetic cores. In this case, "low inductivity tolerance" is understood to be, for example, a tolerance of less than ±3% (or ±5%) within an application temperature range of, for example, −40° to 120° C. in relation to the nominal inductivity at room temperature (for example, 20°, 22° or 25° C.). On the other hand, in order to keep the reject-rate low, sorting out components that fall outside of this tolerance range should be avoided wherever possible.

The exemplary magnetic cores explained below are made of soft magnetic material, such as an amorphous or nanocrystalline material, and feature a data medium on which data in machine-readable form is stored. The data represents values of at least one magnetic parameter of the magnetic core or its corresponding electrical parameter, measured at at least two different temperatures. The data medium can be indirectly or directly attached to the magnetic core, indirectly or directly mounted on the magnetic core or integrated in the magnetic core. The data medium can be immovably or movably positioned with respect to the magnetic core or removable. The magnet core can exhibit a permeability within the range of μ=20,000 to 200,000, for example, between 50,000 and 120,000.

An exemplary component comprises at least one magnetic core and one data medium. The component may also include one or more additional elements. In such a case, the data medium can, be as an alternative, be firmly connected to one of the additional elements. For example, the component may include a housing (for example in the form of a core trough) in which the magnetic core is inserted. The data medium can then be, for example, firmly connected to the housing and indirectly connected to the magnetic core. One element of the assembly can be a conductor wire, wound around the magnetic core or the housing that contains the magnetic core. The magnetic core can have various geometric forms; it can be, for example, a ring-shaped magnetic core, a magnetic core with an oval-shaped cross-section, a square-shaped cross-section, etc.

Figure 3:
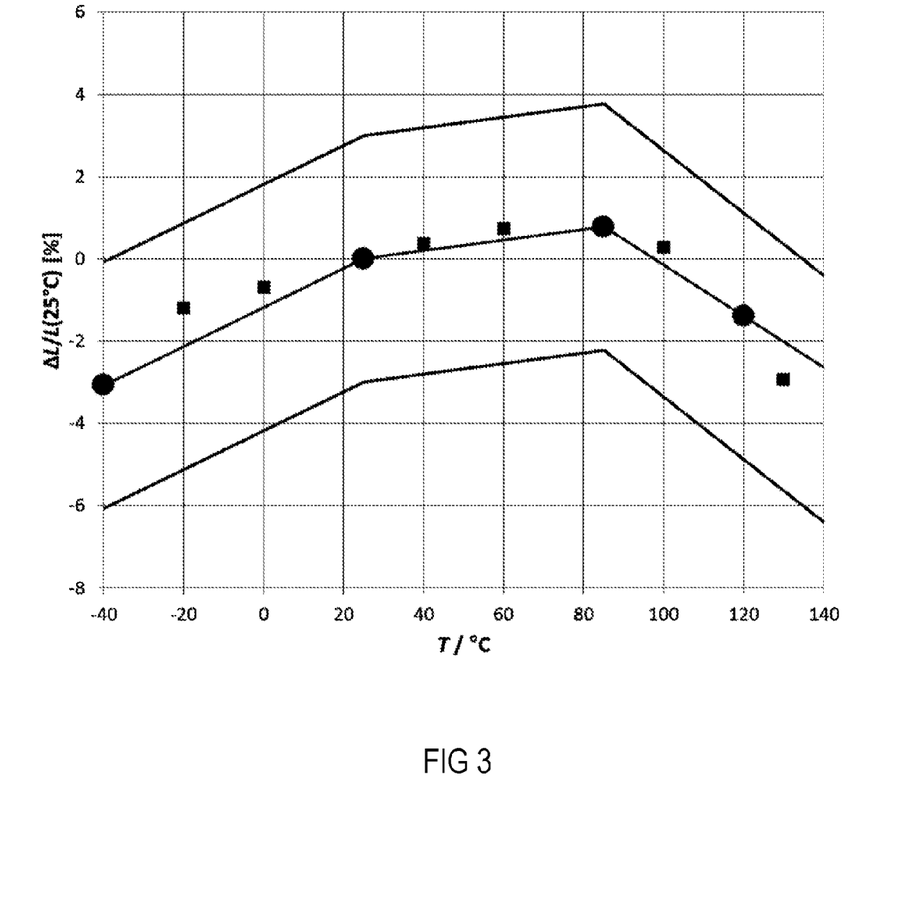
FIG. 3 is a diagram the inductivity of a magnetic core within a temperature range of −40 to 140° C. and with a tolerance range of ±3%.

The diagram shown in FIG. 3 depicts in percentages the deviation in inductivity LT of an exemplary current-compensated choke at various temperatures within a temperature range of −40° to 140° C. The measured values are marked with a solid black square, the selected temperatures are −40, 25, 85 and 120° C. The corresponding inductivity at these temperatures is represented as a circle surrounding the solid black square. The temperature of 25° C. is assumed to be room temperature and serves as the reference temperature. The percentage deviation d presented in FIG. 3 refers to the inductivity $L_{25}$ of the choke, which is measured at room temperature and which serves as the reference value. The deviation in inductivity LT from the inductivity $L_{25}$ at room temperature was calculated according to the following equation:

$$d = \frac{L_T - L_{25}}{L_{25}} 100\%$$

The data that is on the data medium in machine-readable form can, for example, be recorded (saved) as a bar code or a matrix code or applied to (saved on) a wire-based or wireless readable semiconductor chip, albeit this list is not exhaustive (to name just a few of the possibilities).

The machine-readable data found on the data medium makes it possible to easily provide reliable information concerning the magnetic and/or electric properties, or a combination thereof, of the corresponding magnetic core or of the corresponding component containing a magnetic core. This presents an advantage, for example, when integrating the component described in the invention into an apparatus, such as an electric or electronic switch.

When integrating the magnetic core or component into a corresponding (electronic) assembly, the data can be (automatically) read from the data medium and then stored in a memory of the assembly. The assembly can then be automatically adjusted or it can self-adjust, allowing for an electronic compensation of occurring tolerances and/or temperature in the magnetic core of the assembly.

(Additional) machine-readable data can be recorded in the data medium, including one or more of, but not restricted to, the following data:

Data representing the name of the component.
Data representing the component's production date.
Data representing the name of the component's manufacturer.
Data representing reference numbers.

Figure 4:
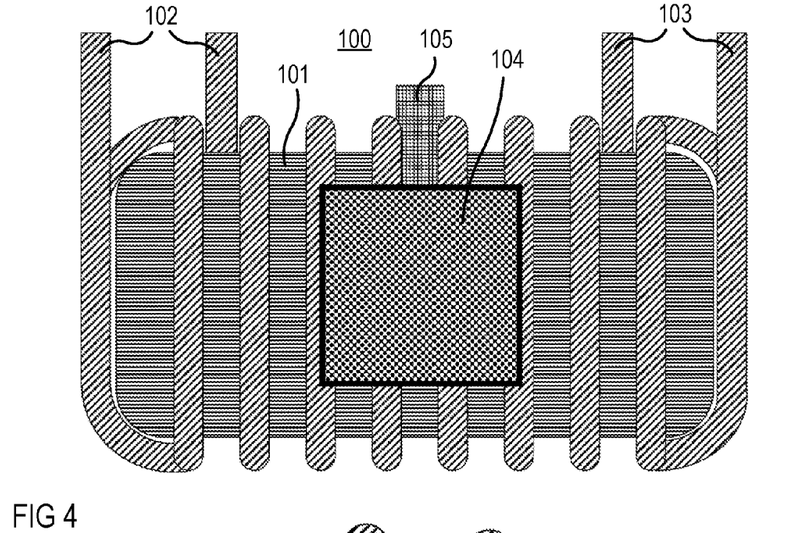
FIG. 4 is a top view of an exemplary inductive component with a directly wound core.
Figure 5:
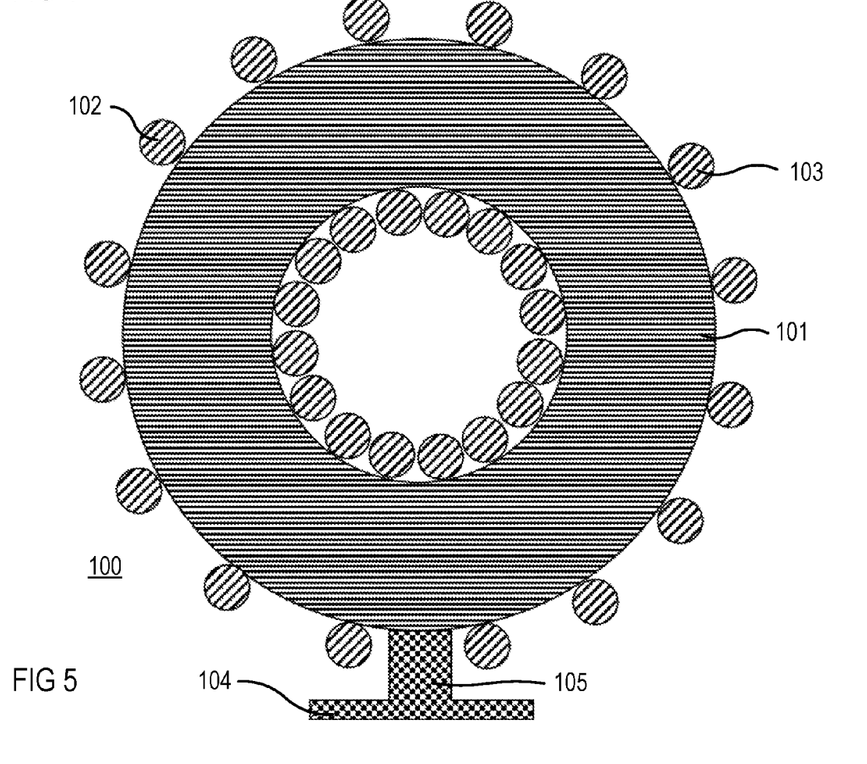
FIG. 5 shows a cross-section of the inductive component depicted in FIG. 4.

An exemplary current-compensated choke 100, shown in FIG. 4 in its top view, radial to the axis of the magnetic core and in FIG. 5 in its cross section, perpendicular to the axis of the magnetic core, features a toroidal magnetic core 101 with an almost rectangular cross section. Two wires 102 and 103, for example, are wound around the magnetic core 101 in two coils, each having numerous windings. A data medium 104, on which machine-readable data is recorded, is mounted on the magnetic core 101 by means of a support 105. The data represents at least one magnetic property of the component, in this example the inductivity of the component at at least two selected temperatures.

In the case of the current-compensated choke 100 shown in FIGS. 4 and 5, the toroidal magnetic core 101 can be, for example, a tape of nanocrystalline material wound into a tape wound core. The tape alloy can be, for example, Vitroperm VP 500 F (a trade name of the firm Vacuumschmelze, Hanau, Germany). This alloy can be economically produced on an industrial scale and, compared to other alloys, is less temperature dependent, provides a high degree of permeability with little variation and is highly durable.

The alloy VP 500 F exhibits low temperature dependency of its permeability and long-term resistance to aging. Its magnetostriction can be virtually reduced to zero, which is a necessary criterion for the mechanical ruggedness of the magnetic core, both during winding as well as later in the switch.

Any other durable, soft magnetic alloy, however, that is suitable for producing magnetic cores with little variation of their permeability may also be used to manufacture the magnetic core. Subjecting the magnetic cores to a thermal treatment may also be part of the manufacturing process.

In order to manufacture the current-compensated choke 100 shown in FIGS. 4 and 5, the magnetic core 101 is wound with the conductive wires 102 and 103. The winding is carried out in such a way that the effects of the tensile and compression forces on the winding, as well as the effects of temperature, are reduced to a minimum.

For example, by winding the magnetic core 101 loosely and with sufficient spacing, the magnetic core 101 can he insulated from the mechanical forces occurring within and on the winding. The conductive wires 102 and 103 can be of enameled copper and have a diameter of around 0.3 to 3 mm, for example, between 0.8 and 1.5 mm.

On the data medium 104 data is recorded that represents the magnetic properties, the electrical properties or both. Here it may be advantageous for the data to refer to the properties of the component and not to the properties of the magnetic core. This will make it possible to take into consideration not only the temperature behavior of the core material, but also the residual influence of the fixation and the electrical effects of the wrapping, such as, for example, coiling capacities and/or the ohmic winding resistance.

Figure 6:
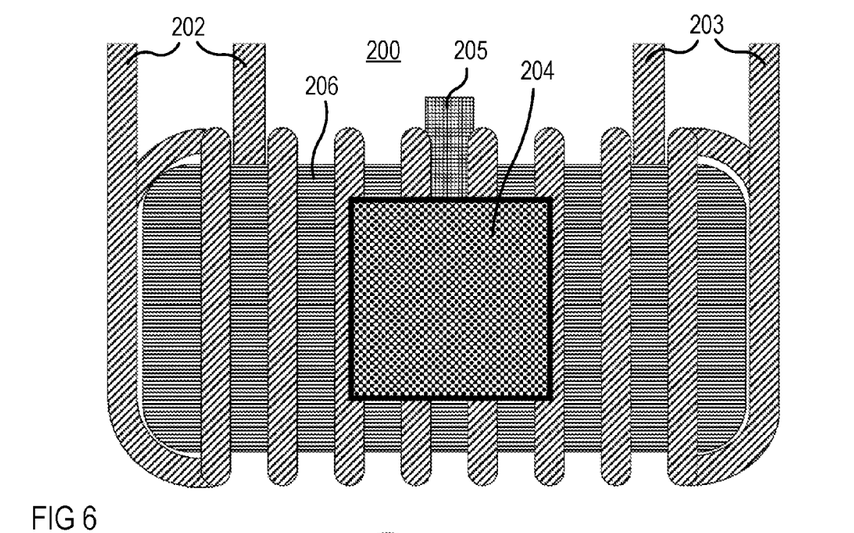
FIG. 6 is a top view of an exemplary inductive component with a wound core in a trough.
Figure 7:
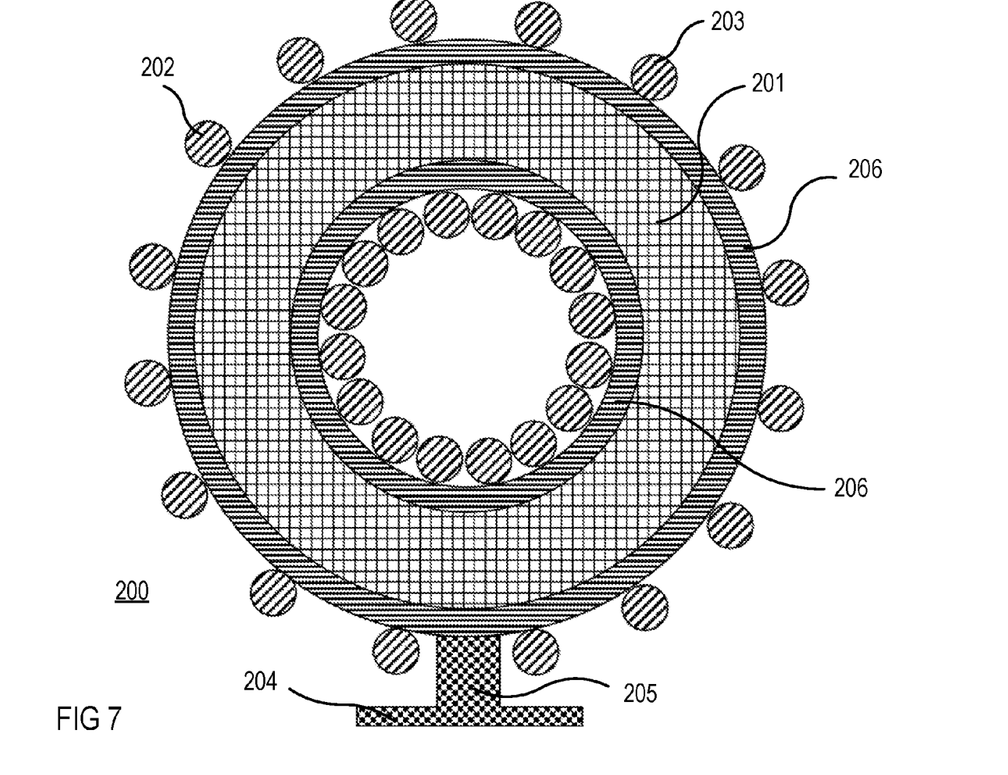
FIG. 7 shows a cross-section of the inductive component shown in FIG. 6.

A further exemplary current-compensated choke 200 featuring a toroidal magnetic core 201 with a rectangular cross section, arranged in a housing 206, is shown in its top view, radial to the axis of the magnetic core, in FIG. 6, and in its cross section, perpendicular to the axis of the magnetic core, in FIG. 7. Two wires 202 and 203, for example, are each wound around the housing 206 in two windings of several coils. A data medium 204 is attached to the outside of the housing 206 by means of a web (crosspiece) 205. Data in machine-readable form is recorded on the data medium 204. The data represents at least one magnetic property of the component, in this case the inductivity of the component, at at least two selected temperatures.

The current-compensated choke shown in FIGS. 6 and 7 also features, for example a toroidal magnetic core, made of wound, nanocrystalline tape material such as the alloy Vitroperm VP 500 F (a trade name of the firm Vacuumschmelze, Hanau, Germany) of an alternative alloy such as Ultraperm, Magaperm, Vitrovac or Trafoperm (trade names of the firm Vacuumschmelze, Hanau, Germany).

In order to manufacture the current-compensated choke 200 shown in FIGS. 6 and 7, the magnetic core 201 is inserted into the housing 206 and fixated, for example with a glue. The housing 206 shields the magnetic core 201. After inserting the magnetic core 201 into the housing 206, the housing 206 can be wound with two conductive wires 202 and 203.

The housing 206 is constructed sufficiently robust to minimize the effects of tensile and compression forces, as well as those of temperature, on the coils. Further, the housing 206 can be adequately constructed so as to insulate the magnetic core 201 from the forces generated by the wrapping. The housing 206 can be made, for example, of plastic and be manufactured, for example, by injection molding.

The conductive wires 202 and 203 can be enameled copper wires and have a diameter of 0.3 to 3 mm, for example between 0.8 and 1.5. The data medium contains data representing the magnetic properties, electrical properties or both. Here it may be advantageous if the data refers to the properties of the component and not to the properties of the magnetic core.

An exemplary way of defining the data representing the magnetic and/or electrical properties of the magnetic core and/or component would be to evaluate the magnetic core or the component in several steps at different temperatures. The values measured at, for example, −40° C., 25° C., 85° C. and 120° C. (compare FIG. 3) are then recorded in machine-readable form on the data medium. The measurements can be carried out, for example, in a continuous process at different temperatures and thus be automated. For this purpose, an installation with heating and cooling cabinets may be employed.

After the evaluation, the measured values can be stored as machine-readable data in the data medium or recorded directly on the magnetic core, either electronically, (for example, in an electronic memory or RFID chip) or mechanically, (for example, with a structured paint application or by applying corresponding stickers, pads or foils). As an example, the data medium can be a sticker, foil, or pad, on or in which the data in machine-readable form is stored as an optical bar code or textured matrix code. As another example, the data medium can be a lacquer coating applied to the magnetic core, the coating having the form of an optic bar code or a textured matrix code for the storage of the data in machine-readable form. As another example, the data medium can be a semiconductor chip and the data in machine-readable form is stored on the semiconductor chip as binary words.

The evaluation of the inductivity properties of the component can be carried out at n individual temperatures in a temperature range of −40° C. to +120° C., n representing a whole number greater than 1. It may be desired to determine the inductivity values at every n temperature for one or more frequencies. For example, the inductivity values at two different temperatures is determined. The determined inductivity values are then stored in the data medium of the component in machine-readable form and can be matched to their corresponding temperatures (for example, by their sequence or by their memory address in connection with pre-defined temperatures at which the measurements were taken), or otherwise allocated (for example, as items of date stored in pairs of measured values and the temperatures at which they were measured).

The data representing a magnetic or electrical property or a combination of the two, can be data, for example, that represents at least one of the following properties: (complex) permeability of the magnetic core, inductivity or impedance of the inductive component or the variation in the inductivity of the inductive component, this list not being exhaustive. Alternative or additional data for two or more differing frequencies may also be provided for.

The data medium should be a medium into which the data can be permanently and automatically recorded and from which it can be automatically read. For example, the data in machine-readable form can be mechanically written onto the data medium. This writing process can be defined as labelling. For this purpose lasers, for example, can be used or a printing process involving the application of structured paint or ink.

Figure 8:
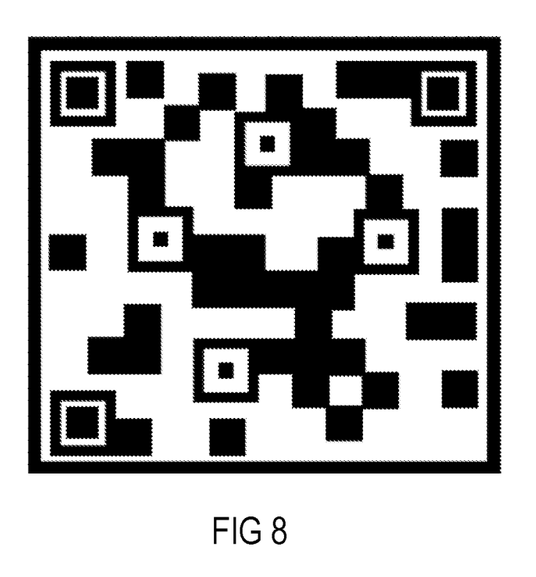
FIG. 8 shows an example of a matrix code that that may be used with the inductive components shown in FIGS. 4 to 7.
Figure 9:
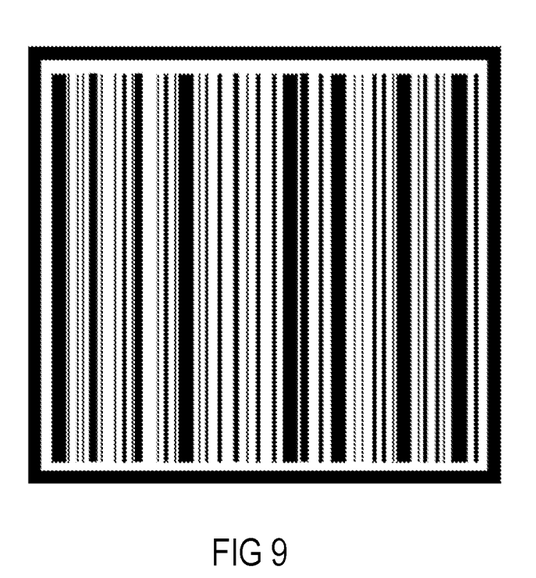
FIG. 9 shows an example of a bar code that may be used with the inductive components of FIGS. 4 to 7.

If electric memory medium is used to store the data this can be, for example, an electronic memory medium such as a non-volatile memory or RFID chips that are embedded in the data medium 104, 204 (not shown). An example of a data medium on which an optic matrix code has been printed is shown in FIG. 8. A corresponding data medium with the application of a line code is shown in FIG. 9.

If the inductive component, for example a current-compensated choke, is employed in a switch, the switch can, for example, compensate for temperature or for tolerances not dependent on temperature, i.e. adjust itself, based on data read from the data medium by an external or integrated reading device and stored on a storage medium of any kind which is a part of the switch.

The device for reading the data can be, for example in the case of optically readable data, such as, for example, optic codes, a camera and in the case of electrically readable data, such as, for example, RFID labels, a corresponding transponder.

The switch can also feature a device for using the data stored on the memory medium to compensate for changes in at least one of the magnetic or electric properties. If the operating temperature of the magnetic core or of the component in accordance with this invention is regularly measured while operating the switch, the data recorded on the data medium and stored in the memory medium can be used to factor in the exact properties of the magnetic core or component at the corresponding operating temperature.

In other words, the data is used to compensate for deviations in the properties of the component that result from the difference between the room temperature (e.g., 25° C.) and the actual operating temperature. For this purpose, analogue or digital calculations can be carried out by a module of the switch using the data stored on the memory medium. A sensor for detecting the temperature of the magnetic core can be employed to measure the temperature of the integrated magnetic core or component while in operation.

Thus, magnetic cores made of amorphous or nanocrystalline material or components containing such magnetic cores, such as, for example, current-compensated chokes, can be produced having a permeability or inductivity in the range of ±3%, in relation to their corresponding initial value, unchanged either by aging or temperature. The initial value of the inductivity can be, for example, the permeability or the inductivity of the component at a reference, for example room, temperature.

The data defined in this manner are customized for every component. This make it possible to achieve a degree of precision in inductivity during the operation of magnetic cores made of amorphous or nanocrystalline materials that, until now, has only been achievable using adjustment processes for ferrite cores having other particular forms. For example, the data stored in machine-readable form for every measured value of magnetic parameter can also comprise at least one corresponding measurement tolerance.

Figure 10:
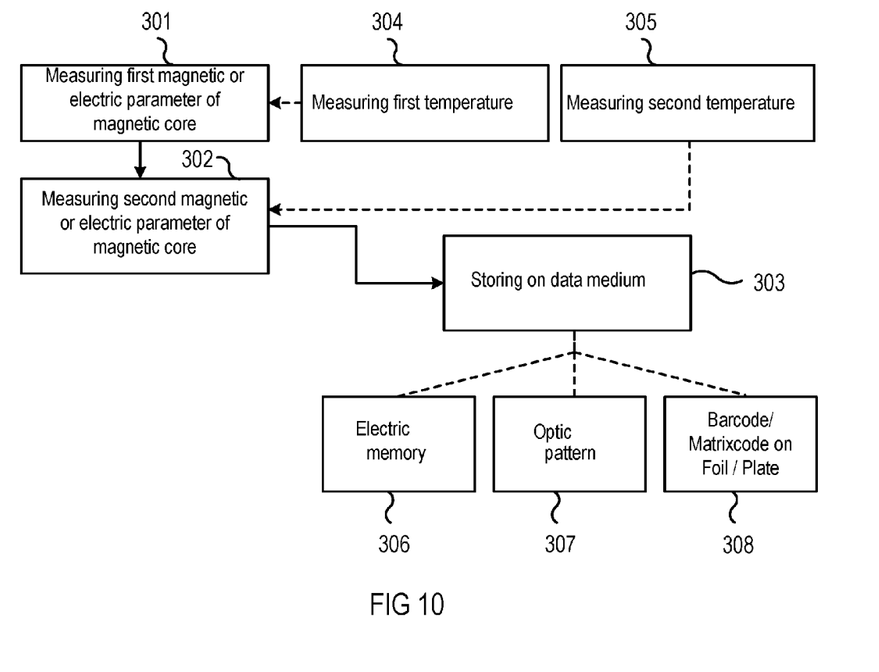
FIG. 10 is a flowchart depicting an exemplary method for producing a magnetic core of a soft magnetic material with a data medium attached to, mounted on or integrated in the magnetic core, with data in machine-readable form stored on the data medium.

FIG. 10 shows an exemplary method for the manufacture of a magnetic core made of a soft magnetic material with a data medium attached to, mounted on or integrated in the magnetic core, the data medium containing data in machine-readable form and representing values of at least one magnetic parameter of the magnetic core or its corresponding electrical parameter, measure at at least one first temperature and at a different second temperature, the method comprising:

Measuring a first value of the at least one magnetic or electrical parameter of the magnetic core at the first temperature and producing representative first data (301) from the measured first value.

Measuring a second value of the at least one magnetic or electric parameter of the magnetic core at the second temperature and producing representative data (302) from the measured second value.

Storing the first and second data on the data medium (303).

Optionally, the measured first temperature (304) and the second temperature (305) can also be stored. The storing can be carried out electrically (306), for example in a semiconductor memory, or encoded in the form of an optic pattern (307) or recorded in another form of labelling (308).

Figure 11:
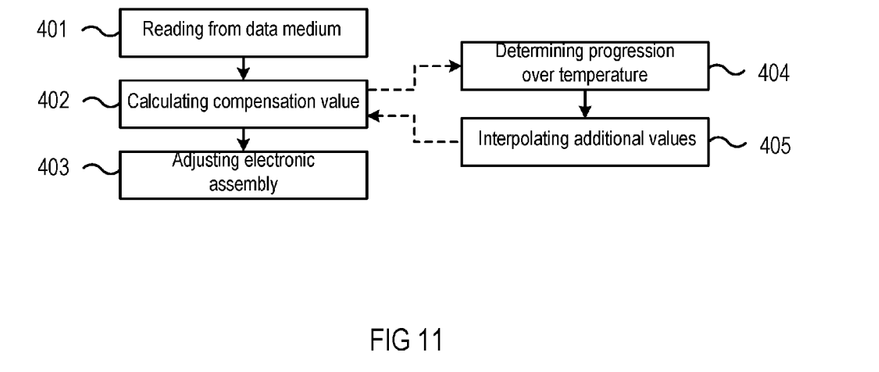
FIG. 11 is a flowchart depicting an exemplary method for producing an electric or electronic assembly with a magnetic core of a soft magnetic material with a data medium attached to or integrated in the magnetic core.

FIG. 11 shows a method for manufacturing an electric or electronic assembly containing a magnetic core made of soft magnetic material with a data medium mounted to or integrated in the magnetic core. The data medium can be used to store data in machine-readable form representing at least one magnetic parameter of the magnetic core or its corresponding electrical parameter, measured at at least two different temperatures. The method comprising:

Automatically reading the machine-readable data from the data medium (401), calculating at least one compensation value based on the read machine-readable data (402) and adjusting the electric or electronic assembly in correspondence to the at least one calculated compensation value (403).

The calculation of at least one compensation value on the basis of the read data (402) can entail determining the progression of the measured parameters over temperature and/or frequency, etc. (404), including an interpolation of additional values from the measured values.

The invention claimed is:

1. A magnetic core made of soft magnetic material including a data medium coupled to the magnetic core storing data in machine-readable form representing at least one of an individualized magnetic parameter of the magnetic core and a corresponding individualized electrical parameter previously measured at at least two different temperatures.

2. The magnetic core of claim 1, where the data stored in machine-readable form also comprises the temperatures that correspond to each value of magnetic parameter.

3. The magnetic core of claim 1, where the data stored in machine-readable form for every measured value of the individualized magnetic parameter also comprises at least one corresponding measurement tolerance.

4. The magnetic core of claim 1, where the individualized magnetic parameter of the magnetic core is its magnetic permeability.

5. The magnetic core of claim 1, where the magnetic core is made of soft magnetic tape.

6. The magnetic core of claim 1, where the soft magnetic material is amorphous or nanocrystalline material.

7. The magnetic core of claim 1, where the magnetic core is wound in at least one wire winding.

8. The magnetic core of claim 7, where the corresponding individualized electrical parameter is the inductivity of the wound magnetic core.

9. The magnetic core of claim 1, where the data medium is a sticker, foil or pad, on or in which the data in machine-readable form is stored as an optical bar code or textured matrix code.

10. The magnetic core of claim 1, where the data medium is lacquer coating applied to the magnetic core, the coating having the form of an optic bar code or a textured matrix code for the storage of the data in machine-readable form.

11. The magnetic core of claim 1, where the data medium is a semiconductor chip and the data in machine-readable form is stored on the semiconductor chip as binary words.

12. A method for the manufacture of an electronic assembly with a magnetic core made of soft magnetic material including a data medium coupled to the magnetic core storing data in machine-readable form representing at least one of an individualized magnetic parameter of the magnetic core and a corresponding individualized electrical parameter previously measured at least two different temperatures, the method comprising:
automatically reading the at least one of the individualized magnetic parameter of the magnetic core and the corresponding individualized electrical parameter previously measured at at least two different temperatures from the data medium,
calculating at least one compensation value on the basis of at least one of the individualized magnetic parameter of the magnetic core and the corresponding individualized electrical parameter previously measured at at least two different temperature, and
adjusting the electric or electronic assembly in accordance with the at least one calculated compensation value.

13. The method of claim 12, where, during the calculation of the at least one compensation value, a discrete or continuous progression over temperature of the at least one magnetic parameter of the magnetic core or its corresponding electrical value is determined from the stored collected data.

14. The method of claim 13, where, during the determination of the discrete or continuous progression over temperature of the at least one magnetic parameter of the magnetic core or its corresponding electrical parameter, further data is interpolated.

15. A method for the manufacture of a magnetic core made of soft magnetic material including a data medium coupled to the magnetic core storing data in machine-readable form representing at least one of an individualized magnetic parameter of the magnetic core and a corresponding individualized electrical parameter previously measured at at least one first temperature and at one different second temperature, the method comprising:
measuring a first value of the at least one of the individualized magnetic and the corresponding individualized electrical parameter of the magnetic core at the first temperature and producing a first representative data from the measured first value;
measuring a second value of the at least one of the individualized magnetic and the corresponding individualized electrical parameter of the magnetic core at the second temperature and producing a second representative data from the measured second value; and
storing the first and second representative data on the data medium.

16. The method of claim 15 comprising in addition: producing third data representing the first temperature; producing fourth data representing the second temperature; and storing the third and fourth data on the data medium.

17. The method of claim 15 where the data to be stored is stored in a semiconductor memory arranged on or in the magnetic core.

18. The method of claim 15 where the data to be stored is applied to the magnetic core in the form of an optic bar code or a matrix code.

19. The method of claim 15 where the data to be stored is integrated in or applied on the sticker, foil or pad in the form of an optic barcode or a matrix code and the sticker, foil or pad is mounted on the magnetic core.

* * * * *